US011808877B2

(12) United States Patent
Dokhanchi et al.

(10) Patent No.: US 11,808,877 B2
(45) Date of Patent: Nov. 7, 2023

(54) METHOD FOR JOINT RADAR-COMMUNICATION

(71) Applicants: IEE INTERNATIONAL ELECTRONICS & ENGINEERING S.A., Echternach (LU); UNIVERSITÉ DU LUXEMBOURG, Esch-sur-Alzette (LU)

(72) Inventors: Sayed Hossein Dokhanchi, Belvaux (LU); Björn Ottersten, Luxembourg (LU); Bhavani Shankar Mysore Rama Rao, Luxembourg (LU); Thomas Stifter, Trier (DE)

(73) Assignees: IEE INTERNATIONAL ELECTRONICS & ENGINEERING S.A., Echternach (LU); UNIVERSITÉ DU LUXEMBOURG, Esch-sur-Alzette (LU)

( * ) Notice: Subject to any disclaimer, the term of this patent is extended or adjusted under 35 U.S.C. 154(b) by 225 days.

(21) Appl. No.: 16/976,313

(22) PCT Filed: Feb. 26, 2019

(86) PCT No.: PCT/EP2019/054722
§ 371 (c)(1),
(2) Date: Aug. 27, 2020

(87) PCT Pub. No.: WO2019/166429
PCT Pub. Date: Sep. 6, 2019

(65) Prior Publication Data
US 2021/0055374 A1    Feb. 25, 2021

(30) Foreign Application Priority Data
Feb. 27, 2018 (LU) .................................. 100714
Apr. 20, 2018 (LU) .................................. 100774

(51) Int. Cl.
*G01S 13/931*   (2020.01)
*G01S 7/00*     (2006.01)
*G01S 13/32*    (2006.01)

(52) U.S. Cl.
CPC ............ *G01S 7/006* (2013.01); *G01S 13/325* (2013.01); *G01S 13/931* (2013.01); *G01S 2013/9316* (2020.01)

(58) Field of Classification Search
CPC ................. G01S 13/325; G01S 13/931; G01S 2013/9316; G01S 7/006
See application file for complete search history.

(56) References Cited

U.S. PATENT DOCUMENTS 5,365,516 A * 11/1994 Jandrell ................ G01S 5/0009
                                                    370/335
9,001,905 B2 * 4/2015 Hamalainen ............ G01S 11/08
                                                    375/330
(Continued)

FOREIGN PATENT DOCUMENTS

EP          3165944 A1      5/2017
KR      101814486 B1      1/2018

OTHER PUBLICATIONS

International Search Report corresponding to International Application No. PCT/EP2019/054722, dated Apr. 25, 2019, 4 pages.
(Continued)

*Primary Examiner* — Timothy A Brainard
(74) *Attorney, Agent, or Firm* — REISING ETHINGTON P.C.

(57) ABSTRACT

A method and system for joint radar communication for automotive applications. The system carries out the method and includes a transmitter transmitting a radar signal, which signal has a phase-modulated continuous waveform and includes information encoded by phase modulation, a receiver, spaced from the transmitter, receiving the signal,
(Continued)

and the receiver detecting the information from the received signal. In order to provide an efficient concept for joint radar-communication for automotive applications, the signal is a multi-carrier phase-modulated continuous waveform having a plurality of carrier frequencies and the information is encoded onto each carrier frequency.

14 Claims, 1 Drawing Sheet

(56) References Cited

U.S. PATENT DOCUMENTS

| | | | | |
|---|---|---|---|---|
| 9,753,121 | B1* | 9/2017 | Davis | G01S 13/18 |
| 2008/0024352 | A1* | 1/2008 | Shirakawa | G01S 13/48 |
| | | | | 342/28 |
| 2009/0147669 | A1* | 6/2009 | Green | H04L 5/12 |
| | | | | 370/215 |
| 2010/0310009 | A1* | 12/2010 | Lakkis | H04L 27/2003 |
| | | | | 375/308 |
| 2013/0201003 | A1* | 8/2013 | Sabesan | G01S 13/878 |
| | | | | 340/10.1 |
| 2014/0266857 | A1 | 9/2014 | Mayer et al. | |
| 2016/0011300 | A1* | 1/2016 | Lee | G01S 7/41 |
| | | | | 342/127 |
| 2016/0334501 | A1 | 11/2016 | Ling | |
| 2017/0041038 | A1* | 2/2017 | Kirkpatrick | H01Q 3/247 |
| 2017/0153314 | A1 | 6/2017 | Siemes | |
| 2017/0310758 | A1 | 10/2017 | Davis et al. | |

OTHER PUBLICATIONS

Written Opinion corresponding to International Application No. PCT/EP2019/054722, dated Apr. 25, 2019, 6 pages.

A. R. Chiriyath, B. Paul and D. W. Bliss, "Radar-Communications Convergence: Coexistence, Cooperation, and Co-Design", IEEE Trans. on Cognitive Commun. and Networking, vol. 3, No. 1, Mar. 2017, 12 pages.
S. H. Dokhanchi, M. R. Bhavani Shankar, Y. A. Nijsure, T. Stifter, S. Sedighi and B. Ottersten, "Joint Automotive Radar-Communications Waveform Design", IEEE International Symposium on Personal, Indoor and Mobile Radio Communications (PIMRC), Montreal, QC, Canada, Oct. 2017, 7 pages.
S. H. Dokhanchi, M. R. Bhavani Shankar, T. Stifter, and B. Ottersten, "OFDM-based Automotive Joint Radar-Communication System", IEEE Radar Conference (RadarConf), Oklahoma, OK, 2018, 6 pages.
B. Li and A. P. Petropulu, "Joint Transmit Designs for Coexistence of MIMO Wireless Communications and Sparse Sensing Radars in Clutter", IEEE Transactions on Aerospace and Electronic Systems, vol. 53, No. 6, Dec. 2017, pp. 2846-2864.
Y. Liu, G. Liao, J. Xu, Z. Yang and Y. Zhang, "Adaptive OFDM Integrated Radar and Communications Waveform Design Based on Information Theory," IEEE Communications Letters, vol. 21, No. 10, Oct. 2017, pp. 2174-2177.
C. Sahin, J. Jakabosky, P. M. McCormick, J. G. Metcalf and S. D. Blunt, "A novel approach for embedding communication symbols into physical radar waveforms", IEEE Radar Conference (RadarConf), Seattle, WA, 2017, 6 pages.
Y. Zhang, Q. Li, L. Huang and J. Song, "Waveform design for joint radar-communication system with multi-user based on MIMO radar", IEEE Radar Conference (RadarConf), Seattle, WA, 2017, 4 pages.
Y. L. Sit et al., "Direction of arrival estimation using the MUSIC algorithm for a MIMO OFDM radar", RADAR Conference (RADAR), IEEE, May 7, 2012, pp. 226-229.
C. Sturm et al., "A multiple target doppler estimation algorithm for OFDM based intelligent radar systems", Radar Conference (EURAD), IEEE, Piscataway, NJ, USA, Sep. 30, 2010, pp. 73-76.

* cited by examiner

METHOD FOR JOINT RADAR-COMMUNICATION

TECHNICAL FIELD

The invention relates to a method for joint radar-communication and to a system for joint radar-communication.

BACKGROUND OF THE INVENTION

One aspect of modern automotive systems that is becoming increasingly important is so-called vehicle-to-everything (V2X) communication, which refers to information exchange between a vehicle and any entity that may affect the vehicle. In general, this may include more specific types of communication like V21 (Vehicle-to-Infrastructure), V2V (Vehicle-to-vehicle), V2P (Vehicle-to-Pedestrian), V2D (Vehicle-to-device) and V2G (Vehicle-to-grid). V2X systems rely on collaborative communications to achieve a real-time high data rate communication for sharing the data in automotive applications like blind spot detection, lane change, emergency and warning signals, traffic light advisories, parking assistance, cruise control, to access to vehicular wireless networks.

Transportation safety can be further enhanced by combining both radar and V2X communication technologies to provide hybrid processing in the sense of enhancing the reliability of communication and leveraging communications for the benefit of sensing. However, this aspect is made non-trivial by spectrum shortage motivating the systems to co-exist. Automotive radar implementations in the mmWave band (79 GHz) is being increasingly considered for the high bandwidths offered. While the radar systems and technology is maturing in mmWave bands, the reuse of radar spectrum for low latency, limited throughput and safety critical communication has started to receive attention of late. In this context, a joint radar-communication (JRC) system has been proposed where the platform performs sensing and communication operations. The major challenge in JRC waveform design is the lack of degrees of freedom (DoF), due to the need to estimate communication symbols in addition to the radar parameters.

B. Li and A. P. Petropulu, "Joint Transmit Designs for Coexistence of MIMO Wireless Communications and Sparse Sensing Radars in Clutter" in *IEEE Transactions on Aerospace and Electronic Systems*, vol. 53, no. 6, pp. 2846-2864, December 2017, discloses a cooperative scheme for the coexistence of communication and collocated MIMO radar systems. The communication rate, power constraint and radar estimate error are considered as performance metrics. In order to maximize the radar SINR, the radar precoder, subsampling scheme, and the communication covariance matrix have been designed jointly to meet these certain performance metrics. However, this concept requires the solution of an optimization problem on symbol level or at least in each coherent processing interval (CPI) which results in a high complex transmit processing.

Y. Zhang, Q. Li, L. Huang and J. Song, "Waveform design for joint radar-communication system with multi-user based on MIMO radar", *IEEE Radar Conference (RadarConf)*, Seattle, Wash., 2017, discusses a multi-carrier quasi-orthogonal (linear frequency modulation-continuous phase modulation) LFM-CPM waveform, wherein each subcarrier is transmitted by one antenna of a MIMO radar. It is shown that the spectral efficiency of this waveform is higher than in a LFM waveform due to using CPM, and the bit error rate (BER) performance is guaranteed.

S. H. Dokhanchi, M. R. Bhavani Shankar, Y. A. Nijsure, T. Stifter, S. Sedighi and B. Ottersten, "Joint Automotive Radar-Communications Waveform Design", presented at *IEEE International Symposium on Personal, Indoor and Mobile Radio Communications (PIMRC)*, Montreal, QC, Canada, October 2017, discloses a JRC waveform that allows exploiting the existing structure of phase-modulated continuous waveform (PMCW) to support the additional functionality of data transmission. Each symbol is modulated by a PMCW code sequence.

Another automotive JRC waveform is disclosed in S. H. Dokhanchi, M. R. Bhavani Shankar, T. Stifter, and B. Ottersten, "OFDM-based Automotive Joint Radar-Communication System", accepted to be presented at *IEEE Radar Conference (RadarConf)*, Oklahoma, Okla., 2018, where the system associates a part of orthogonal frequency-division multiple access (OFDMA) subcarriers for radar processing followed by other subcarriers enabling radar and communication functionalities.

In Y. Liu, G. Liao, J. Xu, Z. Yang and Y. Zhang, "Adaptive OFDM Integrated Radar and Communications Waveform Design Based on Information Theory," in *IEEE Communications Letters*, vol. 21, no. 10, pp. 2174-2177, October 2017, an adaptive OFDM-JRC waveform design method is proposed. This concept is based on the solution of an optimization problem considering the conditional MI for radar and data rate for communications with constraint on the total power. With low transmit power, this approach outperforms equal power allocation. However, prior knowledge about the sensing area is necessary.

In C. Sahin, J. Jakabosky, P. M. McCormick, J. G. Metcalf and S. D. Blunt, "A novel approach for embedding communication symbols into physical radar waveforms", in *IEEE Radar Conference (RadarConf)*, Seattle, Wash., 2017, a robust approach to embed information into radar emissions has been proposed while preserving constant envelope waveforms with good spectral containment. Therein, information sequences are implemented using continuous phase modulation (CPM) and phase-attached to a polyphase-coded frequency-modulated (PCFM) radar waveform.

A. R. Chiriyath, B. Paul and D. W. Bliss, "Radar-Communications Convergence: Coexistence, Cooperation, and Co-Design," in *IEEE Trans. on Cognitive Commun. and Networking*, vol. 3, no. 1, March 2017, discusses JRC information bounds and their accompanying weighted spectral efficiency measures. A new concept is introduced according to which communications rate bits and estimation rate bits do not have equal value.

SUMMARY

It is thus an object of the present invention to provide an efficient concept for joint radar-communication for automotive applications.

This problem may be solved by a method and system according to the claims.

One aspect of the invention provides a method for joint radar-communication for automotive applications. "Joint radar-communication" or "joint radar and communication" in this context is to be understood as a concept where radar transmissions are not only used for detection and ranging, but also for communication, i.e. for transmitting information. The method is adapted for automotive applications, where the respective information is transmitted and/or received by a car.

In a first step of the method, a transmitter transmits a radar signal, which signal is a phase-modulated continuous waveform and comprises information encoded by phase modulation. The radar signal of course is an electromagnetic signal, the wavelength of which is not restricted within the scope of the invention. However, for automotive applications, the wavelength may be between 1 and 10 mm. The transmitter may in particular be installed in a car. Of course, the signal is transmitted by at least one transmitter antenna of the transmitter. It is understood that the transmitter may also encode the respective information before transmitting the radar signal. The radar signal, which of course can be used for detection and ranging, also comprises information which is encoded by phase modulation. The information is usually encoded as a sequence of symbols, which are binary-encoded by different phase angles. As the information is normally digital information, the phase modulation may also be referred to as phase-shift keying (PSK). It should further be noted that the signal may be transmitted by a single antenna, but that transmitting the signal by using multiple antennas has some advantages, such as angles of arrival estimation becomes easier, obtaining higher gain, etc.

In a second step, a receiver, spaced from the transmitter, receives the signal. In an automotive application, the receiver may also be installed in a car different from the car with the transmitter. The signal is received by at least one antenna of the receiver. In this context, receiving "the signal" is not to be construed in that the signal is unchanged between the transmitter and the receiver. Rather, the signal normally undergoes changes due to absorption, reflection, dispersion or other effects. After receiving the signal, the receiver detects the information from the received signal. Detecting the information may also be referred to as decoding or retrieving the information.

The signal is a multi-carrier phase-modulated continuous waveform having a plurality of carrier frequencies and the information is encoded onto each carrier frequency. In other words, the radar signal employs a certain bandwidth with a plurality of carrier frequencies, corresponding to subcarriers, each of which is used for encoding information. In other words, each of the carrier frequencies is phase modulated to encode information. The number of carrier frequencies is in general 2 or more, but may in particular be between 3 and 20 or between 5 and 10. Usually, the carrier frequencies are equally spaced, but this is not necessary for carrying out the invention. The signal may be a multi-carrier phase-modulated continuous waveform (MC-PMCW). The MC-PMCW normally involves transmission of a PMCW code, modulated by a communication symbol on the different subcarriers (i.e. carrier frequencies that are spread about a bandwidth). For many applications, e.g. for automotive radar and communication, there is only a certain bandwidth available. By employing a plurality of carrier frequencies, the available bandwidth can be leveraged to a greater extent. In other words, more information can be transmitted during a certain time interval. At the same time, as will be discussed further below, the detection and ranging functionalities of the radar signal are not negatively affected by the use of multiple carriers. Therefore, detection and communication can occur simultaneously with a single waveform so that there is no need for multiplexing. Also, a signal with a PMCW code that is modulated by a communication symbol is robust to multi-user interference. The code e.g. enables distinction of different users.

In general, encoding the information by phase modulation may be performed in different ways. For instance, it is possible to use the phase itself for encoding the information. It is preferred, though, that the information is encoded by differential phase shift keying (DPSK) as by utilizing DPSK the method becomes more robust against any fixed phase changes that may happen to communication symbols. In other words, not the phase itself, but the change of the phase is used to encode the information. Encoding schemes like differential binary phase shift keying (DBPSK) or differential quadrature phase shift keying (DQPSK) may be used. Differential encoding is preferred since there is no need for any reference phase and phase differences are maintained even if the entire signal is phase-shifted in an unknown way between the transmitter and the receiver.

Although a single antenna may be used to transmit the signal, the signal is preferably transmitted by a plurality of transmitter antennas of the transmitter. The transmitter antennas may be disposed as a uniform linear array, which comprises e.g. between 2 and 20 or between 5 and 10 transmitter antennas. The plurality of antennas may e.g. be used for beamforming of the radar signal.

It is preferred that every carrier frequency is transmitted by every transmitter antenna. This means that every transmitter antenna is used for transmitting the same information. The radar signal transmitted by each transmitter antenna may essentially be the same, although a certain phase shift may be introduced between the antennas in order to direct the signal into a certain direction.

A single antenna may be used to receive the signal, but the signal is preferably received by a plurality of receiver antennas of the receiver. Like the transmitter antennas, the receiver antennas may be disposed as a uniform linear array, which comprises e.g. between 2 and 20 or between 5 and 10 transmitter antennas. It is understood that if a plurality of transmitter antennas is employed, every receiver antenna normally receives a signal from every transmitter antenna.

One important function of the radar signal is of course detection and ranging. Therefore, the signal is preferably reflected by at least one target and at least one target-related parameter is estimated based on the received signal. Here and in the following, "estimated" means "determined" or "calculated" while it is understood that several factors may influence the accuracy of the calculation. Such factors may be approximations in the mathematical model used, numerical inaccuracies, noise etc. A target may be any object by which the radar signal can be reflected, i.e. another vehicle, a pedestrian, a stationary object or the like. The at least one target-related parameter may be related to a position of the target and/or a velocity of the target. It is understood that position and velocity normally can only be detected relative to the transmitter or the receiver, respectively.

Preferably at least one bistatic range is estimated for each target. The bistatic range is the sum of the distance (or range) from the transmitter to the target and the distance from the target to the receiver. More specifically, it may be the sum of the distance from the transmitter (or a transmitter antenna of the transmitter, respectively) to the target and the distance from the target to a receiver antenna of the receiver. If there is a plurality of receiver antennas, a bistatic range can be estimated for each receiver antenna.

According to one embodiment, which will be explained by way of example further below, the information is detected based on the at least one bistatic range. In other words, the estimated value for the at least one bistatic range is used in detecting the information. One might also say that information detection depends on the estimated bistatic range.

For each target, the at least one bistatic range can be re-estimated based on the detected information. In other words, the initially estimated value for the at least one bistatic range is regarded as a first estimation with an unknown accuracy. Once the information is detected, this result can be used to re-estimate the at least one bistatic range, thereby obtaining a second, possibly more accurate estimation. The second estimation may be used as the final result or it may be combined with the first estimation, by some kind of (possibly weighted) averaging.

Furthermore, for each target, at least one bistatic Doppler shift can be estimated based on the detected information. The bistatic Doppler shift is the sum of the Doppler shift from the transmitter to the target and the Doppler shift from the target to the receiver. Since these two individual Doppler shifts may have opposite signs, the absolute value of the bistatic Doppler shift may be smaller than each of the individual absolute values. It is understood that each individual Doppler shift is directly related to a radial velocity of the target in relation to the transmitter or the receiver, respectively. More specifically, the bistatic Doppler shift may be sum of the Doppler shift from the transmitter (or a transmitter antenna of the transmitter, respectively) to the target and the Doppler shift from the target to a receiver antenna of the receiver. If there is a plurality of receiver antennas, a bistatic Doppler shift can be estimated for each receiver antenna.

Preferably, for each target, at least one angle of arrival is estimated. This angle of arrival of course refers to the direction of the target with respect to the receiver, or, more specifically, with respect to a receiver antenna of the receiver. If there is a plurality of receiver antennas, an angle of arrival can be estimated for each receiver antenna.

If the receiver comprises a plurality of receiver antennas, it is normally not necessary to know a certain quantity (bistatic range, bistatic Doppler shift or angle of arrival) with respect to a specific receiver antenna. This is mostly because the receiver antennas are relatively close together in comparison to the typical distances between the transmitter and the receiver or a target, respectively. For automotive applications, the receiver antennas are normally disposed within considerably less than 1 m of each other, while the distance to a target (another vehicle, a pedestrian or the like) or to the transmitter (e.g. in another vehicle) is typically several meters or several tens of meters. If different values for a certain quantity are estimated for each individual receiver antenna, these could theoretically be combined using triangulation methods. However, this is normally not necessary or not efficient to improve the accuracy of any estimations. Rather, it is preferred that least one quantity is estimated by averaging over all receiver antennas. This means that a value (or an estimation) for the respective quantity is obtained for each receiver antenna and the average of these values is used as an estimate for the quantity. Here and in the following, averaging normally refers to the arithmetic mean.

In some cases, e.g. when estimating the bistatic Doppler shift, the quantity may also be estimated by averaging over the transmitter antennas.

As mentioned above, the information may comprise a plurality of symbols. In this case, at least one quantity can be estimated by averaging over all detected symbols. In other words, the quantity is determined for each detected symbol and afterwards the average over all symbols is taken. The respective quantity may in particular be the bistatic range and/or the angle of arrival. This averaging may be combined with the above-mentioned averaging over all receiver antennas.

The above-mentioned quantities may be determined for each carrier frequency (i.e. each subcarrier) individually. At least one quantity is estimated by averaging over all carrier frequencies (or subcarriers). This is based on the assumption that quantities like the bistatic range, the angle of arrival or the bistatic Doppler shift should be independent of the carrier frequency.

In another aspect, the invention also provides a system for joint radar communication, comprising a transmitter adapted to transmit a radar signal, which signal has a phase-modulated continuous waveform and comprises information encoded by phase modulation, and a receiver adapted to, when spaced from the transmitter, receive the signal and detect the information from the received signal, wherein the signal is a multi-carrier phase-modulated continuous waveform having a plurality of carrier frequencies and the information is encoded onto each carrier frequency.

These terms have been already explained above with respect to the method and therefore will not be explained again. The transmitter may comprise a signal generation unit which is adapted to encode the information and to control transmission of the signal. The transceiver may comprise a signal evaluation unit which is adapted to detect the information and, optionally, estimate at least one target-related quantity.

Preferred embodiments of the system correspond to those of the method.

BRIEF DESCRIPTION OF THE DRAWINGS

Further details and advantages of the present invention will be apparent from the following detailed description of not limiting embodiments with reference to the attached drawing, wherein.

DETAILED DESCRIPTION

Figure 1:
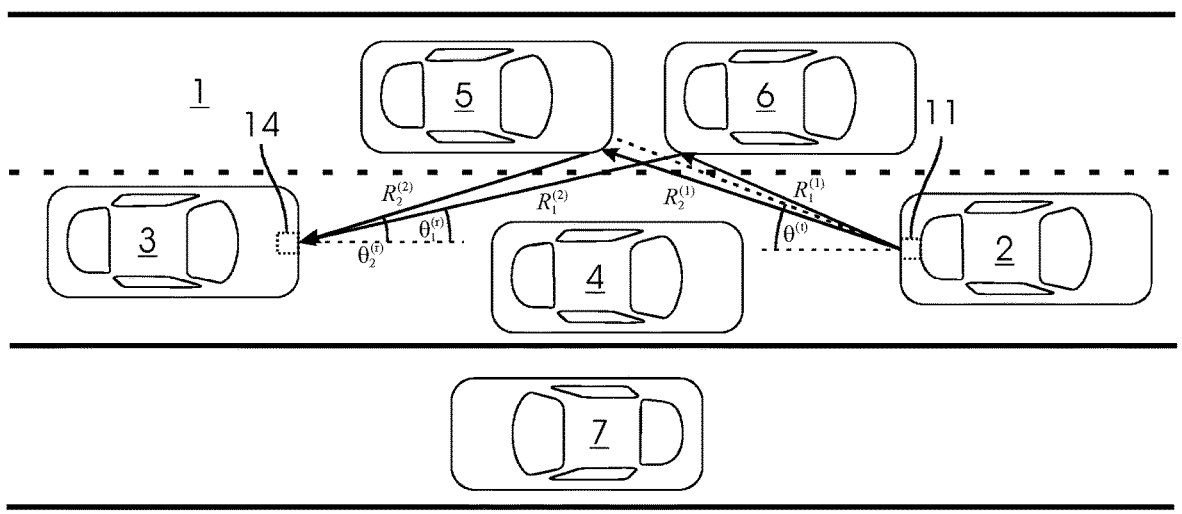
FIG. 1 is a schematic view of road with several cars illustrating an application of the inventive method.
Figure 2:
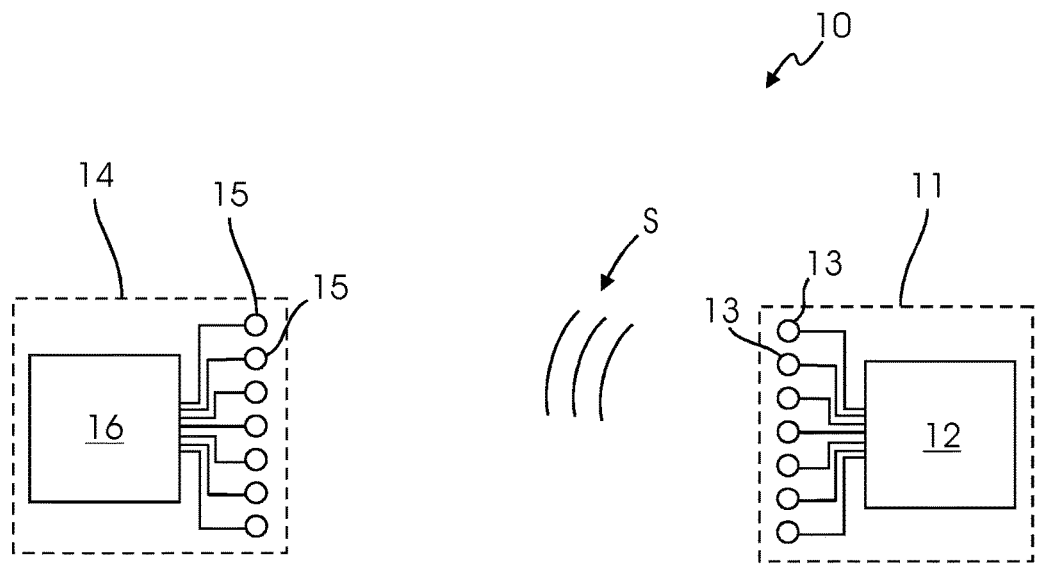
FIG. 2 is a schematic view of an embodiment of the inventive system.

The illustrated method and system will now be described with respect to FIGS. 1 and 2, wherein FIG. 1 shows a road 1 with several cars 2-7. A first car 2 and a second car 3 are moving in the same lane with a third car 4 in between, thereby blocking a line of sight between the first car 2 and the second car 3. A fourth and fifth car 5, 6 are moving in a neighboring lane. The first and second car 2, 3 comprise a transmitter 11 and a receiver 14, respectively, which are part of a system 10 for joint radar-communication, which is shown in FIG. 2. The illustration in FIG. 2 is greatly simplified. The transmitter 11 comprises a signal generation unit 12 coupled to $N_t$ transmitter antennas 13, which are arranged in a uniform linear array (ULA). The number $N_t$ can be chosen variably, e.g. between 2 and 10. The signal generation unit 12 is configured to generate a radar signal S, which is transmitted by the transmitter antennas 13. As will be discussed below, information is encoded onto the signal S by way of phase-modulation. The receiver 14 comprises $N_r$ receiver antennas 15, which are coupled to a signal evaluation unit 16. When the signal S from the transmitter 11 is received by the receiver antennas 15, the signal evaluation unit 16 is adapted to detect the information encoded therein and to estimate (or determine) several quantities which will be discussed below.

In the scenario shown in FIG. 1, the first car 2 attempts to communicate with the second car 3. Apart from communication, the second car 3 should be able to leverage the reflections of the radar signal S by the third car 4 and the fourth car 5, which can be referred to as targets, to estimate target-related quantities. $R_q^{(1)}$ and $R_q^{(2)}$ are transmit-target and target-receiver ranges of target q, respectively. The $\theta^{(t)}$ is angle of departure, $\theta_1^{(r)}$ and $\theta_2^{(r)}$ are angles of arrival (AoA). By the information encoded in the radar signal S, the first car 2 may convey its location and velocity information along with its own sensing data, so that the second car 3 can estimate range and velocity of targets. As an approximation, the third and fourth car 4, 5 can be considered as point targets, thus being defined by a nonfluctuating radar cross section (RCS), bistatic range (i.e. the distance $R_q^{(1)}$ from the transmitter 11 to the target 4, 5 plus the distance $R_q^{(2)}$ from the target 4, 5 to the receiver 14), bistatic Doppler shift (i.e. the Doppler shift from the transmitter 11 to the target 4, 5 plus the Doppler shift from the target 4, 5 to the receiver 14) and angle of arrival $\theta_1^{(r)}$, $\theta_2^{(r)}$ of a signal reflected by the respective target 4, 5. The receiver 14, or rather the signal evaluation unit 16, is adapted to recover bistatic range, AoA, bistatic Doppler shift, and the encoded information together. In the context of this example, Doppler shifts and flight time for the paths are assumed to be fixed over the coherent processing interval (CPI).

In the following, lowercase and uppercase denote vectors and matrices, respectively. $(.)^T$, $(.)^*$ and $(.)^H$ denote the transpose, conjugate and Hermitian (conjugate transpose), respectively. The $I_n$ represents the identity matrix of size n, $0_{n\times m}$ is n×m all-zero matrix. $s(t)=u(t)-u(t-t_c)$, where $u(t)$ is step function. The symbols $\odot$ and $\otimes$ stand for element-wise Hadamard and Kronecker products, respectively. $[c_{i,j}]_{i=1,j=1}^{N,M}$ denotes a N×M matrix, $\|v\|$ stands for Frobenius norm i.e.

$$\sqrt{\sum_{k=1}^{N}|v_k|^2}, [c]_m$$

is mth element of vector c, and $[C]_m$ is mth column of matrix C.

The radar signal S transmitted by the transmitter 11 is a multi-carrier phase-modulated continuous waveform (MC-PMCW). The MC-PMCW for the CPI involves transmission of a PMCW code i.e. $e^{j\phi_l}$, modulated by a communication symbol on $N_c$ different subcarriers (i.e. carrier frequencies that are spread about a bandwidth B). More specifically, each symbol is modulated onto the different subcarriers by differential phase shift keying (DPSK). $t_b$ is the transmission time of one symbol (also referred to as slow-time) and $t_c$ is the chip time (also referred to as fast-time). $a_{n,m}$ is a communication DPSK symbol on nth subcarrier of mth MC-PMCW symbol, since the DPSK is robust against the constant phase terms. The waveform transmitted by the i-th transmitter antenna 13 on the n-th subcarrier can be written as $$x_{i,n}(t) = \sum_{m=0}^{M-1} a_{n,m} \left[\sum_{l=0}^{L-1} e^{j\phi_l} s(t-lt_c-mt_b)\right] e^{j2\pi(f_c+f_n)t} \times e^{jk\sin(\theta^{(t)})(i-1)\frac{\lambda}{2}}, \quad \text{Eq. (1)}$$

$$i \in [1, N_t], n \in [1, N_c]$$

where the information in is the phase modulation, i.e. $a_{n,m}=\exp(j\theta_{n,m})$, $N_c$ is the number of subcarriers, $$f_n = n\Delta f = \frac{nB}{N_c}$$

represents uniform intervals for frequency division, B is the total bandwidth, $$k = \frac{2\pi}{\lambda}$$

is wave number, $\lambda$ is wavelength, $f_c$ is carrier frequency. L is length of the code sequence, and $\theta^{(t)}$ is angle of departure.

The transmitted waveform of Eq. (1) can be represented in matrix form as $$X_i = u^{i-1} A \otimes s^T \in \mathbb{C}^{N_c \times LM}, \quad \text{Eq. (2)}$$

where $A=[a_{n,m}]_{n=0,m=0}^{N_c-1,M-1}$ contains communication symbols, $s=[e^{j\phi_l}]_{l=0}^{L-1}$ is code sequence and $$u = e^{jk\sin(\theta^{(t)})\frac{\lambda}{2}}.$$

After superposition of the reflected signals from Q targets (e.g. the third car 4 and the fourth car 5), the received signal at receiver antenna p takes the form $$z_{p,n}(t) = \quad \text{Eq. (3)}$$

$$\sum_{q=1}^{Q}\sum_{i=1}^{N_t}\sum_{m=0}^{M-1}\sum_{l=0}^{L-1} d'_q a_{n,m} h'_{p,n}(t) e^{jk\sin(\theta^{(t)})(i-1)\frac{\lambda}{2}} \times e^{j\phi_l} s(t-lt_c-mt_b-\tau_q) +$$

$$\eta_p(t),$$

where $d'_q$ models both the effects of propagation loss and cross section of qth target, and $$h'_{p,n}(t) = e^{j2\pi(f_c+f_n)\left(t-\tau_q-\frac{\Delta v_q}{c}t\right)} e^{jk\sin(\theta_q^{(r)})(p-1)\frac{\lambda}{2}}$$

where $\Delta v_q=\Delta v_q^{(1)}+\Delta v_q^{(2)}$, $\Delta v_q^{(1)}$ and $\Delta v_q^{(2)}$ are the relative radial velocity components of transmitter-target and target-receiver for qth target, respectively. $\tau_q=\tau_q^{(1)}+\tau_q^{(2)}$, $\tau_q^{(1)}$ and $\tau_q^{(2)}$ are the signal flight time of transmit-target and target-receiver paths for qth target, respectively. $\eta_p(t)$ is circular complex Gaussian noise.

Since $\frac{\Delta v_q}{c} \ll 1$, one can approximate, $f_n\left(1-\frac{\Delta v_q}{c}\right) \approx$ $$f_n \text{ and } h'_{p,n}(t) \approx e^{j2\pi(f_c t - f_{D_q} t - f_c \tau_q + f_n t - f_n \tau_q)} e^{jk\sin(\theta_q^{(r)})(p-1)\frac{\lambda}{2}},$$

where $$f_{D_q} = f_c \frac{\Delta v_q}{c}$$

denotes the bistatic Doppler shift due to presence of target q. Downconverting Eq. (3) to baseband, for each antenna p and subcarrier n we get $$y_{p,n}(t) = \sum_{q=1}^{Q}\sum_{m=0}^{M-1}\sum_{l=0}^{L-1} d_q a_n h_{p,n}(t) e^{j\phi_l} \times s(t-lt_c-mt_b-\tau_q) + \eta_p(t), \quad \text{Eq. (4)}$$

-continued where $d_q = \sum_{k=1}^{N_t} d'_q e^{jk\sin(\theta^{(t)})(i-1)\frac{\lambda}{2}} e^{-j2\pi f_c \tau_q}$ and $h_{p,n}(t) =$ Eq. (5)

$$e^{j2\pi(-f_{D_q}t - n\Delta f \tau_q)} e^{jk\sin(\theta_q^{(r)})(p-1)\frac{\lambda}{2}}.$$

Sampling $y_{p,n}(t)$ at intervals of $$t_c = \frac{t_b}{L},$$

one can rewrite Eq. (5) as $$h_{p,n,m,l} = h_{p,n}((l+mL)t_c) = e^{-j2\pi f_{D_q} m t_b} e^{-j2\pi f_{D_q} l t_c} e^{-j2\pi n \Delta f \tau_q} e^{jk\sin(\theta_q^{(r)})(p-1)\frac{\lambda}{2}}.$$

Suppose $$\tau_q = \frac{R_q}{c} \text{ and } R_q = R_q^{(1)} + R_q^{(2)}$$

is a bistatic range. For values that are realistic for automotive applications one can approximate $e^{-j2\pi f_{D_q} l t_c} \approx 1$ for all l. This leads to a simplification of $h_{p,n,m,l}$ as $$h_{p,n,m} \approx e^{-j2\pi f_{D_q} m t_b} e^{-j2\pi n \Delta f \tau_q} e^{jk\sin(\theta_q^{(r)})(p-1)\frac{\lambda}{2}}.$$

One can collect all of the samples in space (spatial samples collected by antennas), frequency (frequency samples are in different carriers) and slow-time (slow-time means sampling at the period of a code, $t_b$) into vectors $c_q$, $b_q$, and $e_q$, respectively, where these vectors are $$c_q = \left[ e^{jk\sin(\theta_q^{(r)})(p-1)\frac{\lambda}{2}} \right]_{p=0}^{N_r - 1}$$

containing angles, $$b_q = \left[ e^{-j2\pi n R_q \frac{B}{cN_c}} \right]_{n=0}^{N_c - 1}$$

gathering range induced phases, and $$e_q = \left[ e^{-j2\pi f_{D_q} m t_b} \right]_{m=0}^{M-1}$$

collecting Doppler shifts, so that $h_{p,n,m} = [c_q]_p [b_q]_n [e_q]_m$. Eq. (4) can be written in matrix form as $$Y_p = \sum_{q=1}^{Q} c_q^{p-1} d_q ((b_q e_q^T) \odot A) \otimes (s^T P_k) + \eta_p \in \mathbb{C}^{N_c \times LM}, \quad \text{Eq. (6)}$$

where $P_k$ is a cyclic permutation matrix which is defined for an integer shift of k as $$P_k = \begin{bmatrix} 0_{k \times L-k} & I_{k \times k} \\ I_{L-k \times L-k} & 0_{L-k \times k} \end{bmatrix} \in \mathbb{C}^{L \times L},$$

where $k \in \{0, \ldots, L-1\}$ is determined by the range of the target q.

The signal evaluation unit 16 of the receiver 14 processes the received signal according to several steps, which are described in detail below. First, the bistatic range is estimated, then the estimates for the bistatic range are used to detect the information, i.e. the data symbols. The bistatic range can then be re-estimated based on the detected information. Also, the bistatic Doppler shift is estimated based on the detected information. Finally, the angle of arrival is estimated. It is understood that for performing the estimation and detection processes described below, the signal evaluation unit 16 may at least partially be software-implemented.

For notational convenience, noise is omitted in the following. We select the block of L elements in mth symbol time from matrix $Y_p$ as $$T_{p,m} = [Y_p]_{n=1, i=mL+1}^{N_c, (m+1)L} = \sum_{q=1}^{Q} d_q c_q^{p-1} [e_q^T]_m ([A]_m \odot b_q)(s^T P_k) \in \mathbb{C}^{N_c \times L}, \quad \text{Eq. (7)}$$

where $m = 0, \ldots, M-1$. Now, for range estimation, the received signal is correlated with our previous known code sequences, and for each value of m, we get the estimated range values.

The bistatic range for the qth target for the mth symbol at the pth receiver antenna, denoted as $\hat{R}_{q,1}^{(p,m)}$ obtained as $ct_c \times k$, where $k \in [0, \ldots, L-1]$ is the kth maxima of $$\|T_{p,m} \Lambda_k\|, \quad \text{Eq. (8)}$$

where $\Lambda_k = P_k^T s^* \in \mathbb{C}^{L \times 1}$. The index "1" in $\hat{R}_{q,1}^{(p,m)}$ denotes that this is the first estimate for the bistatic range. Considering the fact that the code sequences are orthogonal, the following property holds:

$$s^T P_k P_{k'}^T s^* = \begin{cases} L, & \text{if } k' = k. \\ 0, & \text{otherwise.} \end{cases} \quad \text{Eq. (9)}$$

It should be noted in this context, that there are 'm' symbols corresponding to 'm' pulses, so that one can use symbols interchangeably with pulses.

Q bistatic ranges are obtained by averaging over all receiver antennas 15 and all range estimates obtained from Eq. (8), which results in $$\{\hat{R}_{q,1}\}_{q=1}^{Q} = \left\{ \frac{1}{MN_r} \sum_{p=1}^{N_r} \sum_{m=1}^{M} \hat{R}_{q,1}^{(p,m)} \right\}_{q=1}^{Q}. \quad \text{Eq. (10)}$$

To detect the communication symbols, the estimate values $\Lambda_k$ from (8) can be used to calculate $T_{p,m} \Lambda_k$. Also, the range estimates of Eq. (10) can be used to reconstruct $\hat{b}_q$, after which the communication symbols can be detected from $$T_{p,m} \Lambda_{k_q} \odot \hat{b}_q^* = L d_q c_q^{p-1} [e_q^T]_m [A]_m \in \mathbb{C}^{N_c \times 1}, \quad \text{Eq. (11)}$$

consequently, the DPSK symbols $[A]_m$ can be demodulated from Eq. (11). Demodulation of DPSK symbols in this context means to map the corresponding complex waveform to its appropriate binary bits. We improve the range estimate by $$O_{p,m} = T_{p,m} \Lambda_{k_q} \odot [\hat{A}^*]_m = L d_q c_q^{p-1} [e_q^T]_m b_q \in \mathbb{C}^{N_c \times 1}.$$

The range for the qth target for the mth symbol at pth receiver antenna, denoted as $\hat{R}_{q,2}^{(p,m)}$, calculated as $$\frac{c}{B} \times k,$$

where $k \in [0, N_c-1]$ is the maxima of $$\|f_k^T O_{p,m}\|, \quad \text{Eq. (12)}$$

where $$f_k = \left[ e^{j2\pi \frac{kl}{N_c}} \right]_{l=0}^{N_c-1}.$$

Then, similar to Eq. (10), the average over all receiver antennas 15 and over all symbols from Eq. (12) is taken to get $\hat{R}_{q,2}$, with the index "2" denoting that this is our second estimate. Finally, the average over $\hat{R}_{q,1}$ and $\hat{R}_{q,2}$ can be taken to improve the estimate.

The 4D-tensor of Eq. (6) can be expressed as slices in different domains, each slice taking a matrix form. In order to retrieve the bistatic Doppler shifts in slow-time, the data tensor can be reordered by fixing the other dimensions i.e., subcarriers, antennas and fast-time samples. A data hypercube slice for a fixed subcarrier n and antenna p can be expressed as $$Z_{p,n} = \sum_{q=1}^{Q} d_q [b_q]_n c_q^{p-1} (e_q \odot [A^T]_n)(s^T P_k) \in \mathbb{C}^{M \times L},$$

and one can define $B_{p,n} = [Z_{p,n}]_l \odot [\hat{A}^H]_n \Lambda_k \in \mathbb{C}^{M \times 1}$ where $\hat{A}$ is the communication symbols estimated from (11). The bistatic Doppler shift for the qth target for the nth subcarrier at pth receiver antenna, denoted as $\hat{f}_{D_q}^{(p,n)}$, obtained as $$\frac{1}{M t_b} \times k,$$

where $k \in [0, M-1]$ is kth maxima of $$\|f_k^T B_{p,n}\| \quad \text{Eq. (13)}$$

where $$f_k = \left[ e^{j2\pi \frac{km}{M}} \right]_{m=0}^{M-1}.$$

Finally, the signal evaluation unit 16 can calculate the bistatic Doppler shifts as $$\{\hat{f}_{D_q}\}_{q=1}^{Q} = \left\{ \frac{1}{N_r N_c} \sum_{p=1}^{N_r} \sum_{n=1}^{N_c} \hat{f}_{D_q}^{(p,n)} \right\}_{q=1}^{Q}.$$

By reshaping equation Eq. (6), defining $c_q = [c_q^{p-1}]_{p=1}^{N_r}$ and looking at the nth subcarrier at the mth symbol, one obtains $$W_{n,m} = \sum_{q=1}^{Q} d_q [b_q]_n [e_q^T]_m a_{n,m} c_q (s^T P_k) \in \mathbb{C}^{N_r \times L},$$

The lth column of matrix $W_{n,m}$ can be selected as $U_{n,m,l} = [W_{n,m}]_l$, $l \in [1, L]$. The AoA of the qth target for the lth sample of the mth symbol at the nth subcarrier, denoted as $\hat{\phi}_q^{(n,m,l)}$, is obtained as $$\sin^{-1}\left( \frac{2 \times k}{N_r} \right),$$

where $k \in [0, N_r-1]$ is kth maxima of $$\|f_k^T U_{n,m,l}\| \quad \text{Eq. (14)}$$

where $$f_k = \left[ e^{-j2\pi \frac{pk}{N_r}} \right]_{p=0}^{N_r-1}.$$

In order to improve the estimate, the average can be taken over all samples, symbols and subcarriers, i.e., $$\{\hat{\phi}_q\}_{q=1}^{Q} = \left\{ \frac{1}{L M N_c} \sum_{l=1}^{L} \sum_{n=1}^{N_c} \sum_{m=1}^{M} \hat{\phi}_q^{(n,m,l)} \right\}_{q=1}^{Q}.$$

As shown above, with the inventive method and system, which make use of multiple subcarriers in a phase-modulated continuous wave form, it is possible to effectively combine target detection and communication.

The invention claimed is:

1. A method for joint radar communication for automotive applications, comprising:
   a transmitter transmitting a radar signal, which signal has a phase-modulated continuous waveform and comprises information encoded by phase modulation,
   a receiver, spaced from the transmitter, receiving the signal, wherein the signal is reflected by at least one target and
   the receiver decoding the information from the received signal and estimating at least one target-related parameter based on the information decoded from the received signal,
   wherein the signal is a multi-carrier phase-modulated continuous waveform having a plurality of carrier frequencies and the information is encoded onto each carrier frequency, wherein the multi-carrier phase-modulated continuous waveform involves transmission of a PMCW code, modulated by a communication symbol on the different carrier frequencies.

2. A method according to claim 1, wherein the information is encoded by differential phase shift keying.

3. A method according to claim 1, wherein the signal is transmitted by a plurality of transmitter antennas of the transmitter.

4. A method according to claim 3, wherein every carrier frequency is transmitted by every transmitter antenna.

5. A method according to claim 1, wherein the signal is received by a plurality of receiver antennas of the receiver.

6. A method according to claim 5, wherein at least one quantity is estimated by averaging over all receiver antennas.

7. A method according to claim 1, wherein for each target, at least one bistatic range is estimated.

8. A method according to claim 7, wherein the information is detected based on the at least one bistatic range.

9. A method according to claim 8, wherein for each target the at least one bistatic range is re-estimated based on the detected information.

10. A method according to claim 8, wherein for each target, at least one bistatic Doppler shift is estimated based on the detected information.

11. A method according to claim 1, wherein for each target, at least one angle of arrival is estimated.

12. A method according to claim 1, wherein the information comprises a plurality of symbols and at least one quantity is estimated by averaging over all detected symbols.

13. A method according to claim 1, wherein at least one quantity is estimated by averaging over all carrier frequencies.

14. A system for joint radar-communication for automotive applications, comprising:
- a transmitter adapted to transmit a radar signal, which signal has a phase-modulated continuous waveform and comprises information encoded by phase modulation,
- a receiver adapted to, when spaced from the transmitter, receive the signal, wherein the signal is reflected by at least one target, and decode the information from the received signal and estimate at least one target-related parameter based on the information decoded from the received signal, wherein the signal is a multi-carrier phase-modulated continuous waveform having a plurality of carrier frequencies and the information is encoded onto each carrier frequency, wherein the multi-carrier phase-modulated continuous waveform involves transmission of a PMCW code, modulated by a communication symbol on the different carrier frequencies.

* * * * *